(12) United States Patent
Eggler et al.

(10) Patent No.: US 12,458,937 B2
(45) Date of Patent: Nov. 4, 2025

(54) MIXING UNIT AND METHOD FOR MIXING A LIQUID PRODUCT

(71) Applicant: Tetra Laval Holdings & Finance S.A., Pully (CH)

(72) Inventors: Thomas Eggler, Rothrist (CH); Denis Steffen, Gränichen (CH); Devis Gangale, Rupperswil (CH); Nora Magoni, Gretzenbach (CH)

(73) Assignee: Tetra Laval Holdings & Finance S.A., Pully (CH)

( * ) Notice: Subject to any disclaimer, the term of this patent is extended or adjusted under 35 U.S.C. 154(b) by 591 days.

(21) Appl. No.: 17/757,692

(22) PCT Filed: Dec. 16, 2020

(86) PCT No.: PCT/EP2020/086507
§ 371 (c)(1),
(2) Date: Jun. 17, 2022

(87) PCT Pub. No.: WO2021/122806
PCT Pub. Date: Jun. 24, 2021

(65) Prior Publication Data
US 2023/0016783 A1    Jan. 19, 2023

(30) Foreign Application Priority Data
Dec. 18, 2019   (EP) .................................... 19217279

(51) Int. Cl.
*B01F 25/21*     (2022.01)
*B01F 25/312*    (2022.01)
(Continued)

(52) U.S. Cl.
CPC ........ *B01F 25/2124* (2022.01); *B01F 25/312* (2022.01); *B01F 25/53* (2022.01); *B01F 35/1453* (2022.01)

(58) Field of Classification Search
CPC ................. B01F 25/2124; B01F 25/53; Y10T 137/86887; Y10T 137/86895; Y10T 137/86348; Y10T 137/86372
See application file for complete search history.

(56) References Cited

U.S. PATENT DOCUMENTS 3,949,777 A  *  4/1976  Caldwell .............. G05D 23/128
                                                  137/271
4,100,614 A  *  7/1978  Mandt .................... B01F 25/211
                                                  366/154.1
(Continued)

FOREIGN PATENT DOCUMENTS

JP       2000 254467       9/2000

OTHER PUBLICATIONS

English translation of JP 2000254467A, Ishimura et al., obtained Jan. 7, 2025 from: <https://worldwide.espacenet.com/> (Year: 2025).*
(Continued)

*Primary Examiner* — Claire X Wang
*Assistant Examiner* — Patrick M McCarty
(74) *Attorney, Agent, or Firm* — Knobbe, Martens, Olson & Bear, LLP

(57) ABSTRACT

A mixing unit (1) for mixing a liquid product (2) includes a tank (3) and a fluid nozzle (4) configured to inject a fluid flow (6, 7) of the liquid product (2) into the tank (3). The fluid nozzle (4) has a first outlet (20) that opens in a sideways direction (S), a second outlet (21) that opens in an upward direction (U), and a valve plug (14) configured to selectively open and close the outlets (20, 21). The mixing unit (1) is operable in a low stage operational mode (9) during which the first outlet (20) is open, the second outlet (21) is closed, and mixing occurs in a lower region (10) of the tank (3), and a high stage operational mode (11) during which the first
(Continued)

outlet (20) is closed, the second outlet (21) is open, and mixing occurs in an upper region (12) of the tank (3).

17 Claims, 9 Drawing Sheets

(51) Int. Cl.
  *B01F 25/53* (2022.01)
  *B01F 35/10* (2022.01)

(56) References Cited

U.S. PATENT DOCUMENTS

| | | | | |
|---|---|---|---|---|
| 4,454,892 A * | 6/1984 | Chadshay | ................. | F23K 5/18 137/625.5 |
| 4,722,363 A * | 2/1988 | Allyn | ..................... | G05D 11/03 137/892 |
| 4,863,277 A * | 9/1989 | Neal | ....................... | B01F 23/59 366/136 |
| 5,233,910 A * | 8/1993 | Laichinger | ......... | B60G 17/0565 137/625.49 |
| 5,348,058 A * | 9/1994 | Ruhl | ....................... | B67C 3/001 141/90 |
| 5,957,387 A * | 9/1999 | Porta | ..................... | B05B 7/2462 239/315 |
| 6,361,201 B1 * | 3/2002 | Russell | ................. | B01F 25/312 366/144 |
| 2002/0104571 A1 * | 8/2002 | Hess | ..................... | F16K 11/048 137/625.29 |
| 2002/0105855 A1 * | 8/2002 | Behnke | ................... | B01F 25/21 366/167.1 |
| 2004/0223407 A1 * | 11/2004 | Gassenschmidt | ....... | B01F 23/53 366/304 |
| 2009/0316518 A1 | 12/2009 | Goldsmith | | |
| 2013/0224358 A1 * | 8/2013 | Michel | .................... | C12C 13/00 366/137 |
| 2014/0054484 A1 * | 2/2014 | Chang | ................... | F16K 11/048 251/318 |
| 2015/0001310 A1 * | 1/2015 | Falster-Hansen | ....... | B01F 25/50 324/697 |
| 2016/0074818 A1 * | 3/2016 | Lowe, Jr. | .............. | B01F 25/211 366/137 |
| 2017/0333928 A1 * | 11/2017 | Chapron | ................ | B01F 25/85 |

OTHER PUBLICATIONS

International Search Report and Written Opinion of PCT/EP2020/086507, dated Mar. 3, 2021, in 6 pages.

* cited by examiner

MIXING UNIT AND METHOD FOR MIXING A LIQUID PRODUCT

TECHNICAL FIELD

The invention relates to a device and method for mixing powders or liquids to produce a liquid product.

TECHNICAL BACKGROUND

Product powders and liquids may be mixed to produce various products, such as food products. Mixing may include stirring, agitating or dissolving a powder in a liquid. It may also comprise mixing two different liquids. Using product powders to form food products is advantageous in that the powder may be stored for long periods of time without being spoiled. The powder may then be easily dissolved in a liquid to form the desired product. Food products that may be formed by powders include dairy beverages, such as milk, non-dairy beverages, such as soft drinks. Product powders may include raw materials such as sugar, milk powder, salt, or flour, or products such as instant formula, instant drinks, or dry broth. Liquid food products are also be suitable for mixing. Liquid food products may include water, melted fat, or recombined milk.

Conventional mixing units are disadvantageous in that multiple tanks, pumps, pipes, and valves are required to obtain different operational modes for mixing. Different pumps may be configured to provide different speeds of fluid flow into a mixing tank for different levels of mixing. Different levels of mixing may be required for different food products or different levels of mixing may be required to ensure complete mixing of a single food product. Typically, one tank is configured for one operational mode such that more than one tank must often be provided for enabling different operational modes. Given that the entire content of each tank must be pump between different tanks, using multiple tanks and components requires large amounts of energy for operation.

SUMMARY

It is an object of the invention to at least partly overcome one or more limitations of the prior art. In particular, it is an object to provide a device and method that enables at least two different operational mixing modes in a single tank.

According to an aspect of the invention, a mixing unit for mixing a liquid includes a tank configured to hold the liquid product, and a fluid nozzle attached to a bottom of the tank and configured to inject a fluid flow of the liquid product into the tank. The fluid nozzle has a first outlet that opens in a sideways direction, a second outlet that opens in an upward direction, and a valve plug configured to selectively open and close the first outlet and the second outlet. The mixing unit is operable in a low stage operational mode during which the first outlet is open, the second outlet is closed, and mixing occurs in a lower region of the tank, and a high stage operational mode during which the first outlet is closed, the second outlet is open, and mixing occurs in an upper region of the tank.

The mixing unit described herein is advantageous in that the low stage operational mode and the high stage operational mode for mixing may occur in the same tank. The operational modes may be selected by moving the valve plug. Selecting the desired operational mode ensures the proper amount of mixing is performed to produce a particular mixture for a food product. Enabling different mixing operations to occur in the same tank reduces the number of tanks, pumps, pipes, and valves used in a mixing system as compared with conventional mixing systems. Consequently, the amount of energy required to operate the mixing system is also reduced.

According to another aspect of the invention, a method for mixing a liquid product includes holding the liquid product in a tank, injecting a fluid flow of the liquid product into the tank via a fluid nozzle attached to a bottom of the tank, selectively opening and closing a first outlet of the fluid nozzle that opens in a sideways direction and a second outlet of the fluid nozzle that opens in an upward direction using a valve plug. The selectively opening and closing comprises opening the first outlet and closing the second outlet to operate the mixing unit in a low stage operational mode during which mixing occurs in a lower region of the tank, and closing the first outlet and opening the second outlet to operate the mixing unit in a high stage operational mode during which mixing occurs in an upper region of the tank.

Still other objectives, features, aspects and advantages of the invention will appear from the following detailed description as well as from the drawings.

BRIEF DESCRIPTION OF THE DRAWINGS

Features of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
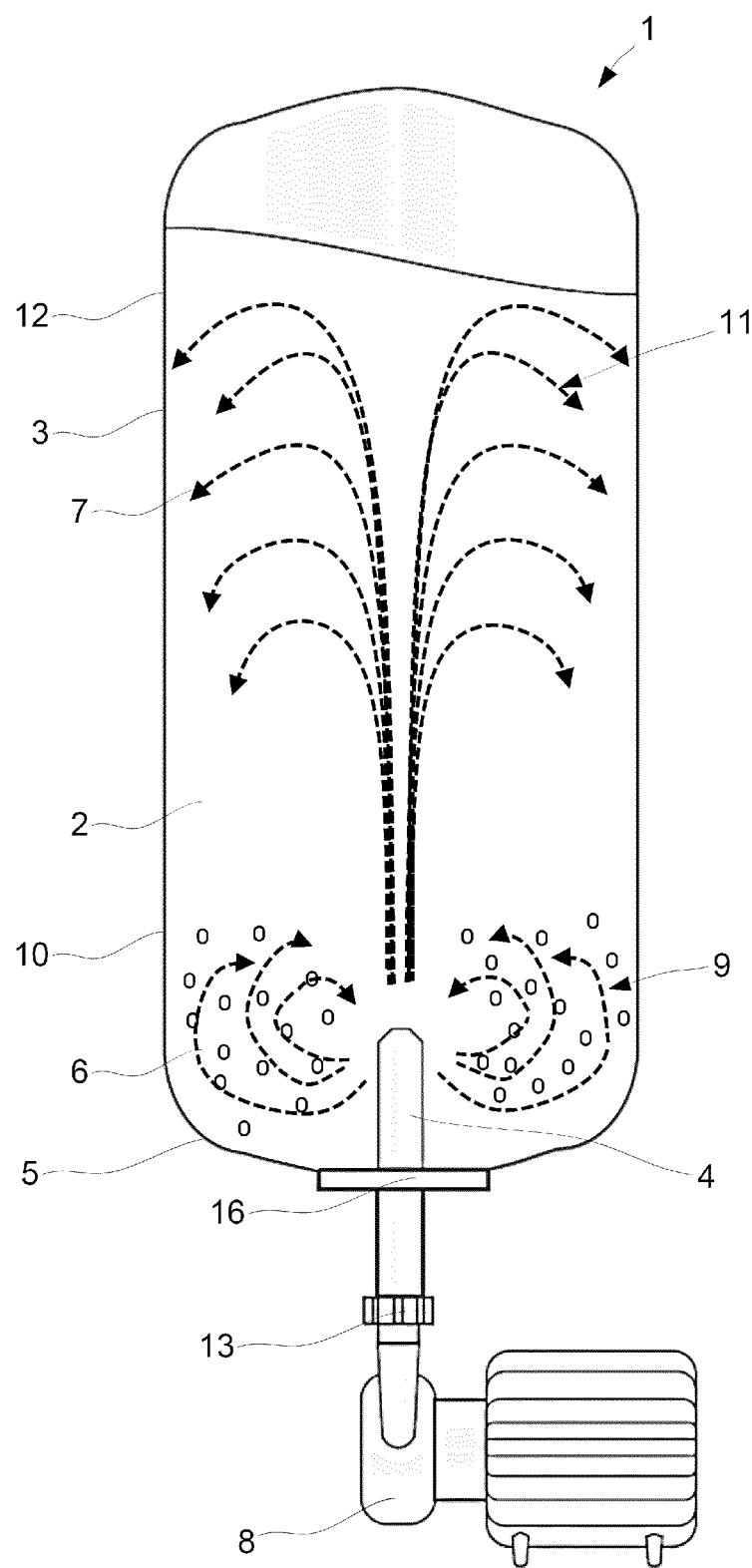
FIG. 1 is a sectional view of a mixing unit for mixing a liquid product.

Referring first to FIG. 1, a mixing unit 1 for mixing a liquid product 2 is shown. The mixing unit 1 includes an enclosed tank 3 that is configured to hold the liquid product 2, and a fluid nozzle 4 that is attached to a first end (bottom) 5 of the tank 3. The liquid product 2 may include different liquid or powdered materials that are mixed. Different liquids may be mixed together or different powders may be mixed with liquids. The term "mixing" may comprise stirring, agitating, or dissolving a powder material in a liquid. Any liquid or powder material may be suitable. Food product powders may include raw materials such as sugar, milk powder, salt, or flour, or finished products such as instant formula, instant drinks, or dry broth. Liquid food products may include water, different fats and oils, and recombined milk.

The tank 3 may be cylindrical in shape and configured to accommodate a predetermined amount of the liquid product 2. The fluid nozzle 4 is configured to inject a first flow 6 of the liquid product 2 and a second flow 7 of the liquid product 2 into the tank 3. The second flow 7 may be greater than the first flow 6. The tank 3 may have a substantially vertical orientation such that the first end of the tank 3 to which the fluid nozzle 4 is attached is the bottom end 5 of the tank 3. The fluid nozzle 4 is fluidly connected to a pump 8 that is driven by an engine. The pump 8 may be arranged below the tank 3 such that the first or second flow 6, 7 of the liquid product 2 travels upwardly into the tank 3 through the bottom end 5 of the tank. The first flow 6 of the liquid product 2 corresponds to a low stage operational mode 9 in which mixing occurs in a lower region 10 of the tank 3 and the second flow 7 of the liquid product 2 corresponds to a high stage operational mode 11 in which mixing occurs in an upper region 12 of the tank 3. Both operational modes occur independently in the same tank 3 during different periods of a mixing cycle. The low stage operational mode may be referred to as a first operational mode, and the high stage operational mode may be referred to as a second operational mode.

Figure 2:
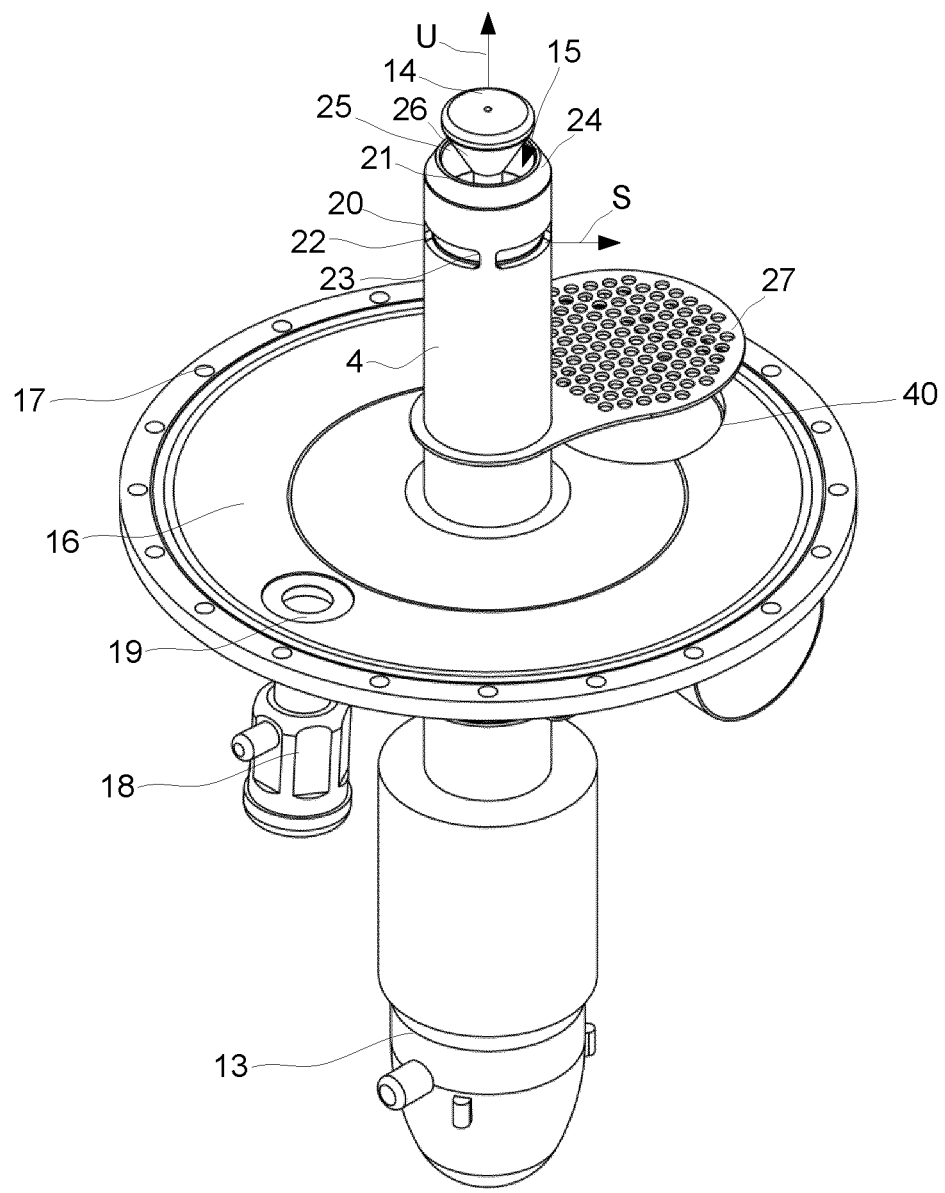
FIG. 2 is a perspective view of a fluid nozzle and a valve plug that is movable relative to the fluid nozzle in the mixing unit of FIG. 1.

Referring in addition to FIG. 2, an actuator 13 is connected to the fluid nozzle 4 for controlling whether the first flow 6 or the second flow 7 of the fluid nozzle 4 occurs. The actuator 13 may be a pneumatic actuator and manually operable from below the tank 3. An operator or a control system may via the actuator 13 be able to translate an elongated control stem 28 (see FIG. 3) in an axial direction, such as upwardly toward the tank 3 and downwardly away from the tank 3 to switch between the operational modes of the fluid nozzle 4. The valve plug 14 is connected to the control stem 28 and is this axially movable relative the body of the fluid nozzle 4 which is in a fixed position relative to the tank 3. The actuator 13, the valve plug 14, and the fluid nozzle 4 each extend along a common central axis. The fluid nozzle 4 may be cylindrical in shape and define a flow chamber 15. The valve plug 14 is movable relative the flow chamber 15 for opening and closing different fluid outlets of the fluid nozzle 4. The flow chamber 15 is fluidly connected between the pump 8 and the tank 3 for supplying the flow 6, 7 of the liquid product 2 into the tank 3.

The fluid nozzle 4 is secured to a plate 16 that is attachable to the bottom end 5 of the tank 3. The plate 16 may be secured to the tank 3 using any suitable fastener, such as bolts that extend through corresponding bolt holes 17 of the plate 16. When the plate 16 is secured to the tank 3, the fluid nozzle 4 is arranged in a fixed position relative to the tank 3 during operation in either the low stage operational mode or the high stage operational mode. A fluid outlet pressure sensor 18 may also be attached to the plate 16 to sense a pressure via an opening 19. The pressure sensor 18 may be used to determine a fluid level in the tank 3 and the actuator 13 may be operable in response to the detected fluid level.

The fluid nozzle 4 may be formed as single continuous part and includes a first outlet 20 that opens in a sideways direction S and corresponds to the low stage operational mode 9, and a second outlet 21 that opens in an upward direction U and corresponds to the high stage operational mode 11. The first outlet 20 is arranged lower than the second outlet 21 when the fluid nozzle 4 is in the vertical orientation. The outlets 20, 21 are formed perpendicular to each other such that the flow direction through each of the outlets 20, 21 is also substantially perpendicular relative to the flow direction through the other outlet. The first outlet 20 is formed as at least one radial slot through the outer surface of the fluid nozzle 4. More than one radial slot may be formed and each radial slot may have a radial length 22 that is greater than an axial width 23 of the slot.

The second outlet 21 defines a diameter that is less than the diameter of the outer surface of the fluid nozzle 4. The fluid nozzle 4 has a tapering surface 24 that tapers radially inwardly from the outer surface of the fluid nozzle 4 to the second outlet 21. The fluid nozzle 4 also defines an inner surface 25 that extends radially inwardly from the second outlet 21 toward the central axis of the fluid nozzle 4. The inner surface 25 forms a valve seat that is engageable with a cone-shaped stopper 26 of the valve plug 14 for closing the second outlet 21. The fluid nozzle 4 may also include a perforated plate 27. The perforated plate 27 may arranged above an outlet of the tank 3 and may be configured to collect large particles that are undissolved in the liquid product 2.

Figure 3:
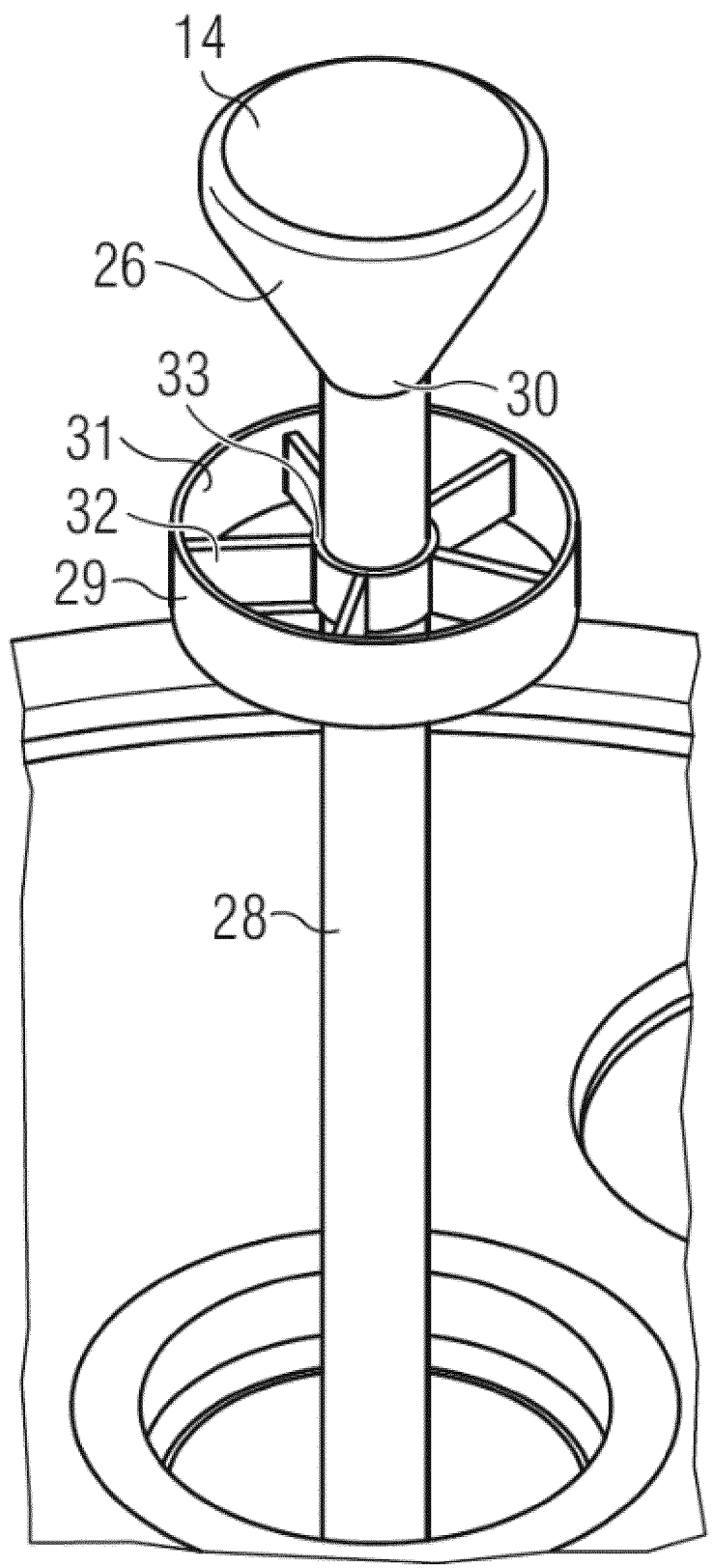
FIG. 3 is a perspective view of the valve plug of FIG. 2.

FIG. 3 shows the valve plug 14 including the cone-shaped stopper 26, the elongated control stem 28, and a wheel-shaped stopper 29, also referred to as a circular stopper 29. An axial end of the control stem 28 is connected to the actuator 13 shown in FIG. 2 such that the control stem 28 extend out of the tank 3. The cone-shaped stopper 26 is arranged at an opposite axial end 30 of the control stem 28. The cone-shaped stopper 26 is formed to widen outwardly and upwardly from the control stem 28. The wheel-shaped stopper 29 includes an outer sleeve 31 and a plurality of spokes 32 that extend radially inwardly from the outer sleeve 31 to an inner ring surface 33 fixedly attached to the control stem 28. The wheel-shaped stopper 29 is engageable against the slots forming the first outlet 20 of the fluid nozzle 4 shown in FIG. 2 for closing the first outlet 20 during the high stage operational mode. The cone-shaped stopper 26, the elongated control stem 28, and the wheel-shaped stopper 29 may be formed integrally such that the valve plug 14 is a single continuous part. Using the wheel-shaped stopper 29 is advantageous in that the plurality of spokes 32 enable fluid flow between the spokes 32 and through the wheel-shaped stopper 29 during both the low stage operational mode and the high stage operational mode.

Figure 4:
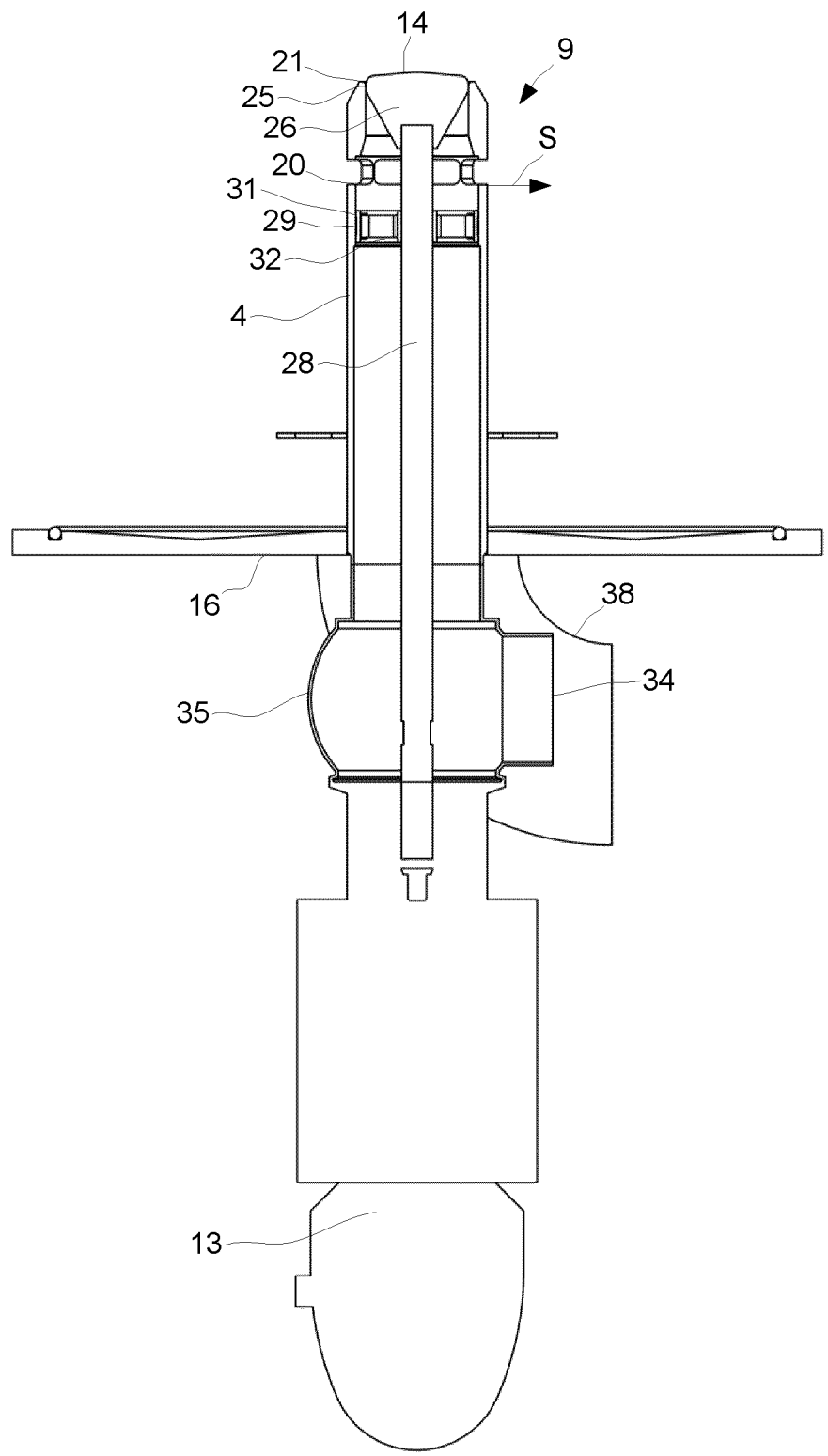
FIG. 4 is a sectional view of the fluid nozzle and the valve plug of FIG. 2 during a low stage operational mode of the mixing unit.
Figure 5:
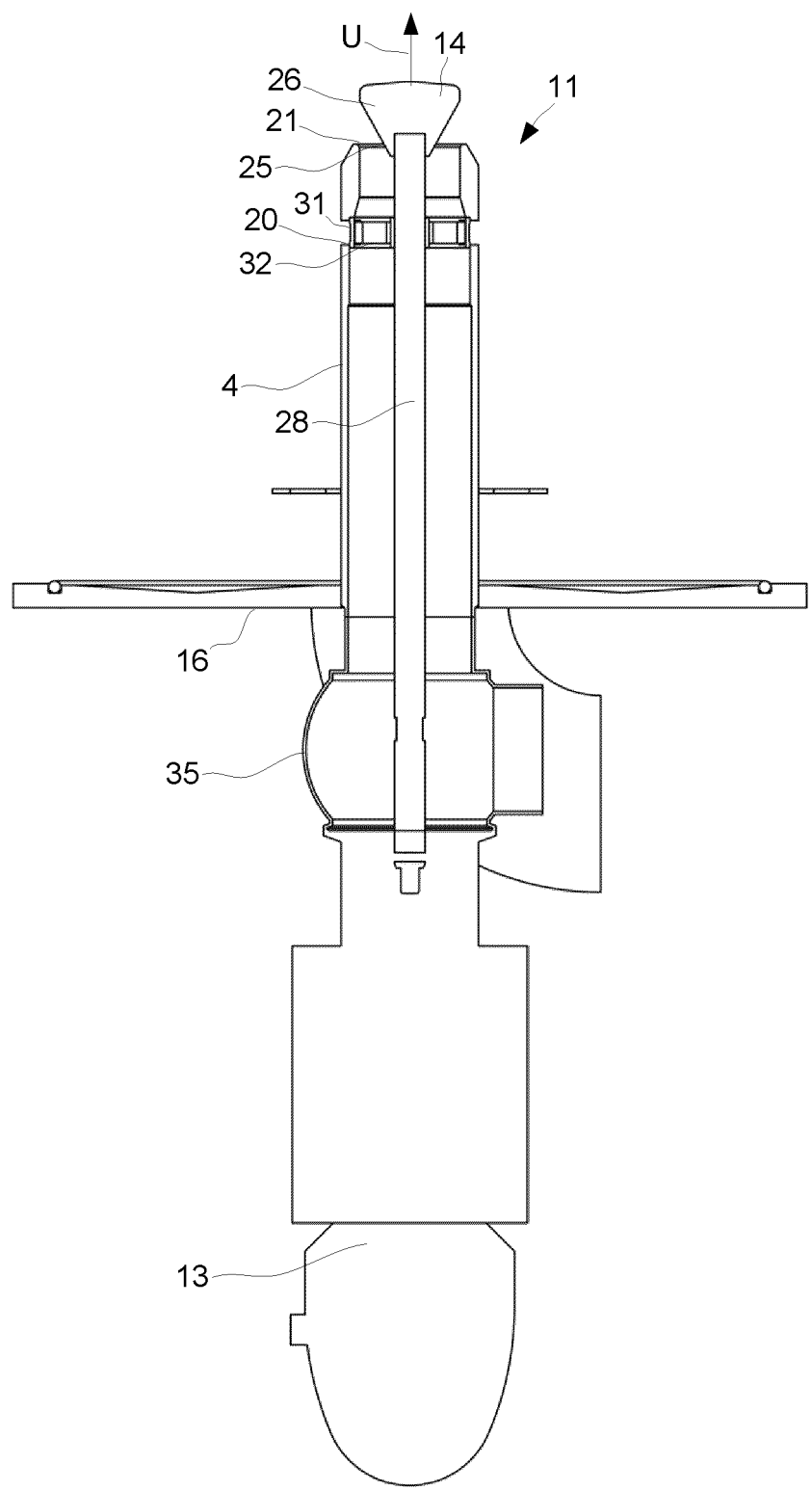
FIG. 5 is a sectional view of the fluid nozzle and the valve plug of FIG. 2 during a high stage operational mode of the mixing unit.

FIGS. 4 and 5 show the axial positions of the valve plug 14 during the low stage operational mode 9 and the high stage operational mode 11 of the mixing unit 1 of FIG. 1, respectively. During the low stage operational mode 9 shown in FIG. 4, the actuator 13 has moved the control stem 28 to a first axial position. Moving the control stem 28 to the first axial position may include pulling the control stem 28 downwardly away from the tank. Movement of the control stem 28 causes corresponding movement of the valve plug 14. The wheel-shaped stopper 29 of the valve plug 14 is thus moved downwardly through the fluid nozzle 4 and away from the first outlet 20. The first outlet 20 is open in the sideways direction S. The outer sleeve 31 of the wheel-shaped stopper 29 may slide downwardly along the inner wall of the fluid nozzle 4 as the wheel-shaped stopper 29 moves away from the first outlet 20. The spokes 32 of the wheel-shaped stopper 29 enable fluid to flow through the wheel-shaped stopper 29 and out of the fluid nozzle 4 through the first outlet 20 for mixing in the lower region of the tank.

The movement of the valve plug 14 also causes the cone-shaped stopper 26 to move toward the inner surface 25 of the fluid nozzle 4 for engagement against the inner surface 25 to close the second outlet 21. When the second outlet 21 is closed, fluid flow in the upward direction out of the fluid nozzle 4 is prevented. Fluid flow is received in the fluid nozzle 4 via a fluid line 34 that is fluidly connected between a pumped fluid source for the liquid product and an inlet port 35 of the fluid nozzle 4. The inlet port 35 may be fixed to the fluid nozzle 4 and axially interposed between the fluid nozzle 4 and the actuator 13. A recirculation line 38 is also shown, allowing for the liquid product to be pumped out from the tank 3. As shown in FIG. 1, the first flow 6 of the liquid product 2 during the low stage operational mode 9 may have a radial pattern in which all the jet streams curve outwardly from the fluid nozzle 4. The streams then curve upwardly in the tank and around to curve back downwardly toward the fluid nozzle 4.

During the high stage operational mode 11 shown in FIG. 5, the control stem 28 is moved to a second axial position by the actuator 13. Advantageously, the operational modes may be switched without disrupting the content of the tank by using the actuator 13. The control stem 28 may be pushed upwardly toward the tank to move into the second axial position from the first axial position shown in FIG. 4. The axial movement of the control stem 28 consequently causes the cone-shaped stopper 26 of the valve plug 14 to move away from the inner surface 25 formed on the fluid nozzle 4 to open the second outlet 21 of the fluid nozzle 4 and enable the flow of fluid in the upward direction U. The wheel-shaped stopper 29 is then translated upwardly just like the cone-shaped stopper 26 such that the outer sleeve 31 covers the slots forming the first outlet 20 of the fluid nozzle 4 to prevent fluid flow in the sideways direction S. The spokes 32 of the wheel-shaped stopper 29 enable fluid to flow through the wheel-shaped stopper 29 and out of the fluid nozzle 4 through the second outlet 21.

Flow of the liquid product in the upward direction U enables mixing in the upper region of the tank. As shown in FIG. 1, the second flow 7 of the liquid product 2 during the high stage operational mode 11 may include a radial pattern in which all the jet streams curve outwardly from an upward stream from the fluid nozzle 4. The jet streams curve downwardly toward the walls of the tank 3 away from the upward stream from the fluid nozzle 4. The fluid nozzle 4 may be configured such that the fluid flow 7 in the upward direction U during the high stage operational mode 11 has a greater velocity as compared with the velocity of the fluid flow 6 in the sideways direction S during the low stage operational mode 9.

Figure 6:
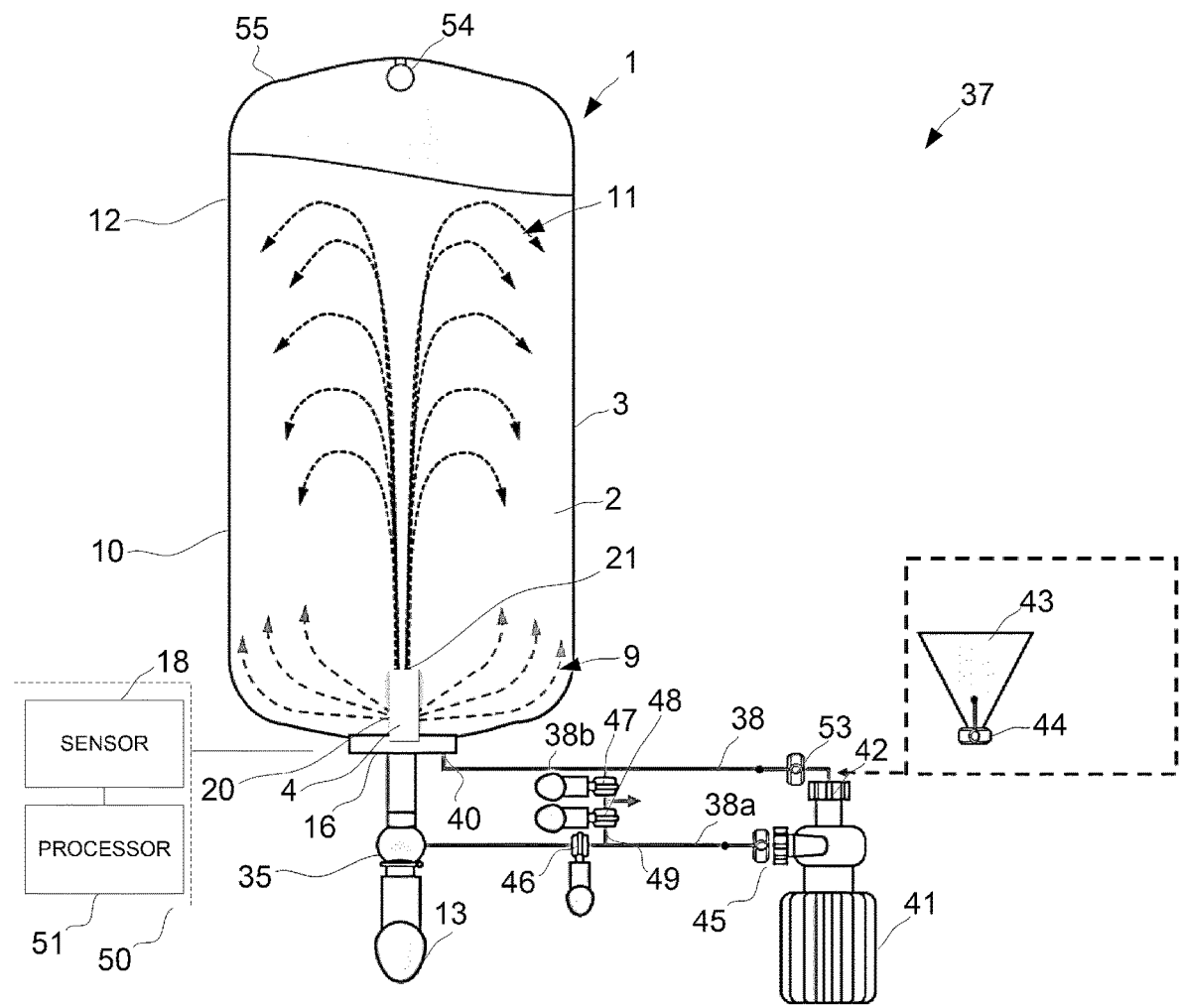
FIG. 6 is a schematic drawing of a mixing system including the mixing unit of FIG. 1.
Figure 7:
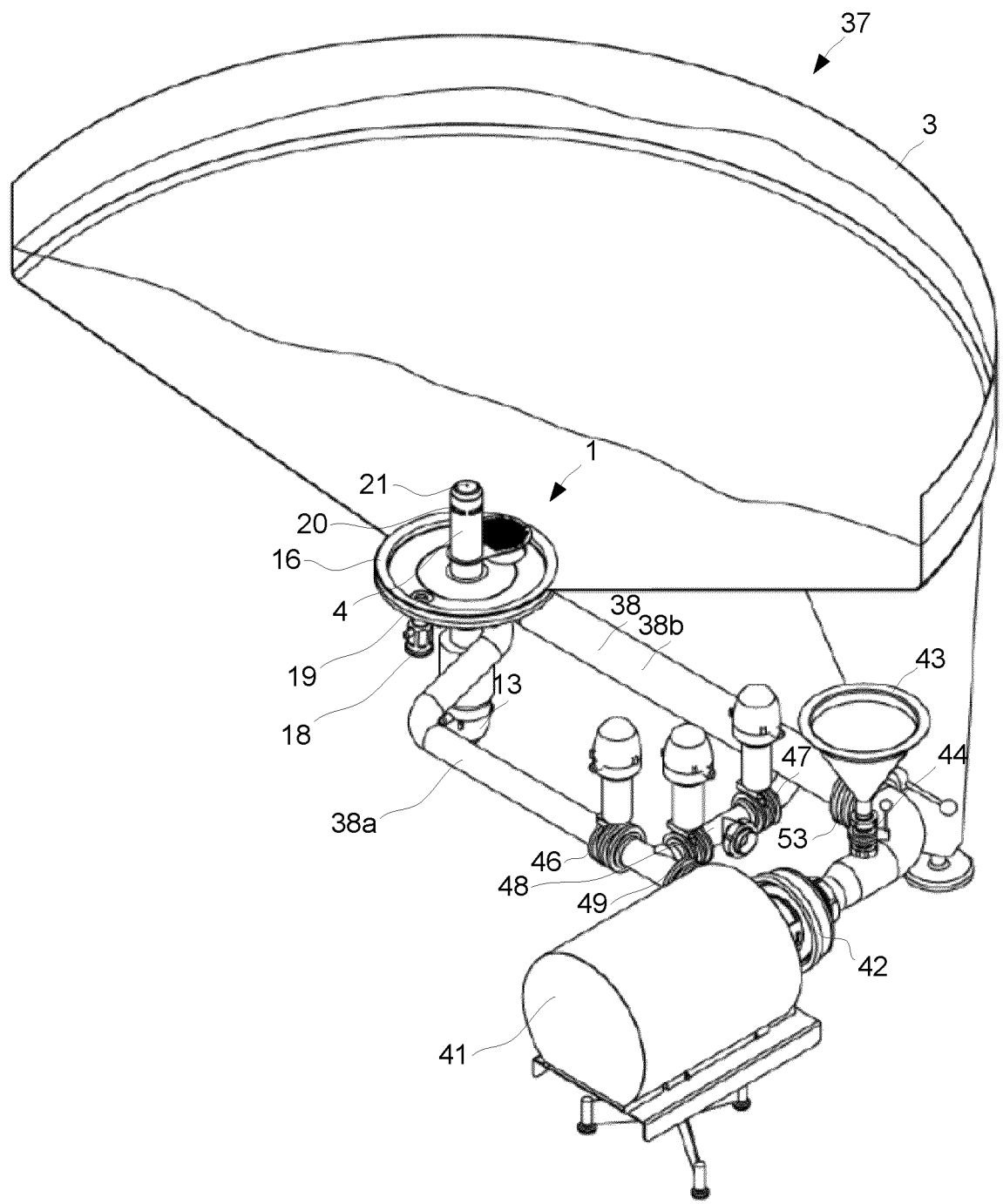
FIG. 7 is a perspective, partial view of the mixing system of FIG. 6.
Figure 8:
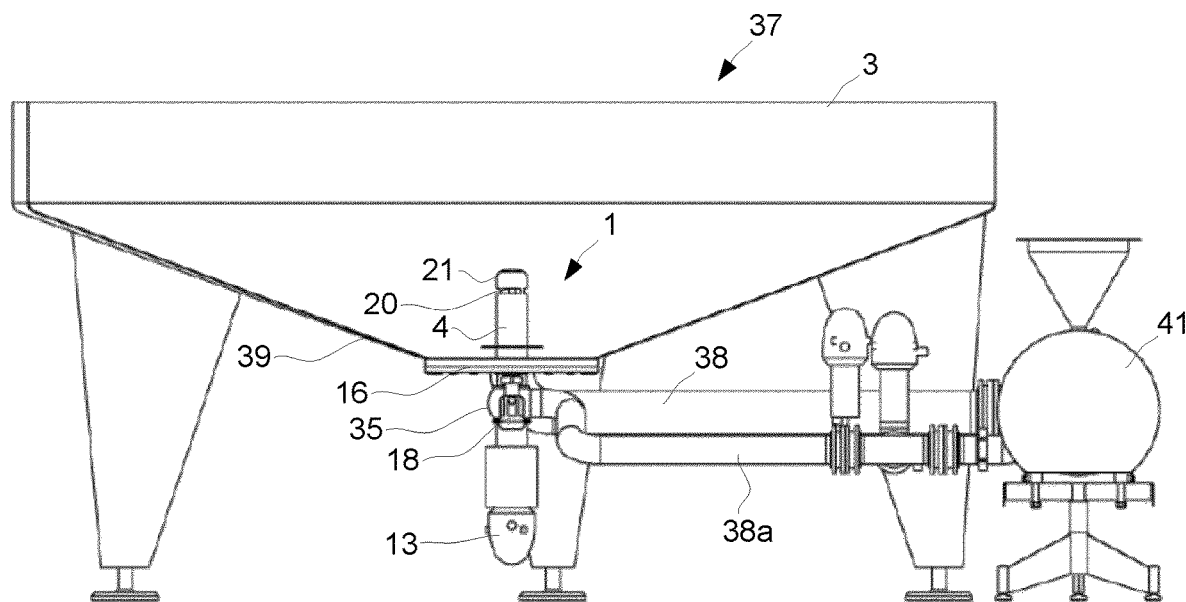
FIG. 8 is a partial front view of the mixing system of FIG. 6.
Figure 9:
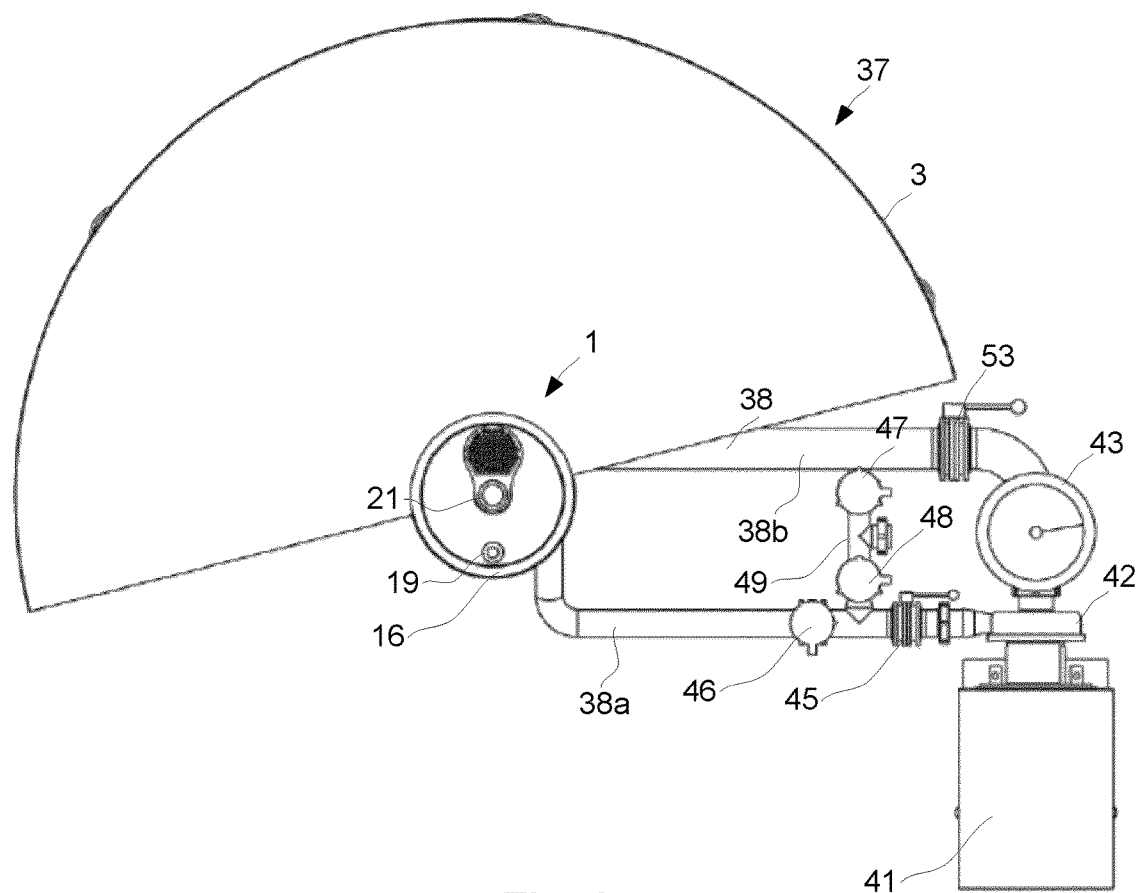
FIG. 9 is a partial top view of the mixing system of FIG. 6.

FIGS. 6-9 show a mixing system 37 for mixing a liquid product including the mixing unit 1 shown in FIGS. 1-5. FIG. 6 shows a schematic view of the mixing system 37, FIG. 7 shows a perspective view of the mixing system 37, FIG. 8 shows a front view of the mixing system 37, and FIG. 8 shows a top view of the mixing system 37. The mixing system 37 includes a recirculation line 38 that is fluidly connected to the mixing unit 1 for drawing fluid from the tank 3 and for returning the fluid to the tank 3. As best shown in FIGS. 6 and 8, the tank 3 may be formed to have a tapered shape 39 at the bottom, tapering radially inwardly toward the plate 16 that supports the fluid nozzle 4 and is secured to the tank 3. As schematically shown in FIG. 6, the plate 16 defines a fluid outlet 40 that is fluidly connected to the recirculation line 38 for drawing fluid out of the tank 3.

A pump 41 is arranged along the recirculation line 38. The pump 41 is fluidly connected to a supply line 38a of the recirculation line 38 and a return line 38b of the recirculation line 38. The supply line 38a is fluidly connected between the pump 41 and the inlet port 35 that is fluidly connected to the fluid nozzle 4, as best shown in FIGS. 6 and 8. The pump 41 may include a connection 42 that is fluidly connected to an infeed arrangement 43 arranged upstream of the pump 41. The infeed arrangement may be a hopper 43 or any other arrangement that is configured to receive an ingredient for insertion into the fluid flow of the recirculation line 38. The ingredient may be a liquid material or a powder material. As best shown in FIGS. 6 and 7, the hopper 43 may include a manual on/off valve 44 for opening and closing the hopper 43. The manual on/off valve 44 may be a butterfly valve. The manual on/off valve 44 is closed to prevent flow from the hopper 43 into the pump 41 and opened to enable flow from the hopper 43 into the recirculation line 38.

Another manual on/off valve 53 may also be arranged along the return line 38b between the fluid outlet 40 and the inlet of the pump 41. This valve 53 is configured to create a venturi effect that draws the ingredient from the hopper 43 into the pump 41 when the manual on/off valve 44 is open. The pump 41 may also include a manual on/off valve 45 arranged between the pump 41 and the supply line 38a to enable and prevent fluid flow from the pump 41 to the supply line 38a. When the manual on/off valve 45 is open, fluid flows downstream from the pump 41 through the supply line 38a toward the inlet port 35. The fluid flow of the liquid product flows from the fluid nozzle 4 into the tank 3, either from the sideways first outlet 20 of the fluid nozzle 4 when the mixing tank 1 is in the low stage operational mode 9, or from the top second outlet 21 of the fluid nozzle 4 when the mixing tank 1 is in the high stage operational mode 11.

At least one distribution valve 46, 47, 48 is arranged along the recirculation line 38 for filling or emptying the tank 3. A first distribution valve 46 may be arranged along the supply line 38a at a location between the pump 41 and the inlet port 35. A second distribution valve 47 and a third distribution valve 48 may be arranged along a connecting fluid line 49 that is fluidly connected between the supply line 38a and the return line 38b.

As also shown in FIG. 2, the tank 3 includes the sensor 18. During operation in either the low stage operational mode 9 or in the high stage operational mode 11, the sensor 18 may be used to detect a fluid level or pressure in the tank 3. Any suitable sensor may be used and the sensor 18 may be secured to the plate 16 at the opening 19 shown in FIGS. 7 and 9. The tank 3 is configured to hold a predetermined amount of the liquid product 2 that may be dependent on the liquid product 2. If the sensor 18 determines that the fluid level of the liquid product 2 exceeds the predetermined amount, fluid may be discharged from the tank 3 through the fluid outlet 40 defined in the plate 16. The sensor 18 may be used to maintain a predetermined volume of the liquid product 2 in the tank.

The sensor 18 may be part of an automated control system 50 including a processor 51 that is communicatively coupled with the sensor 18 to receive data about the fluid level in the tank 3. The sensor 18 may be a pressure sensor, fluid level sensor, optical sensor, temperature or thermostat sensor, or any other suitable sensor arranged to detect a liquid level in the tank. More than one sensor may be provided and the sensor may be arranged at different locations along the tank 3. The control system 50 may be configured to operate other components of the mixing unit 1 in response to the detected fluid level of the tank 3. The control system 50 may also be configured to output data pertaining to the fluid level such that an operator may control the manual valves to adjust fluid flow in the mixing system 37 based on the outputted data.

When fluid is discharged from the tank 3 through the fluid outlet 40, the fluid flows through the return line 38*b* back toward the pump 41. The fluid may flow to the pump 41 or to the connecting fluid line 49 that is fluidly connected between the return line 38*b* and the supply line 38*a*.

In addition to the low stage operational mode 9 and the high stage operational mode 11, the mixing unit 1 may also be operable in a cleaning mode in which the tank 3 is drained of the fluid product 2 and a cleaning fluid is supplied to the tank 3. During the cleaning mode, cleaning fluid may be inserted into the tank 3 via a fluid port 54, as shown in FIG. 6. The fluid port 54 may be arranged at a top end 55 of the tank 3 opposite from where the fluid nozzle 4 is fixed to the tank 3. The cleaning fluid may be added to the tank 3 to fill the tank 3 to a level that is below the position of the first outlet 20 of the fluid nozzle 4. The actuator 13 may be operated to move the valve plug 14 upwardly and open the second outlet 21, as shown in FIG. 5. During the cleaning mode, the valve plug 14 may have the same position as during the high stage operational mode 11. The first outlet 20 is closed and the cleaning fluid may flow in the upward direction to ensure cleaning in the upper region 12 and the lower region 10 of the tank 3.

Figure 10:
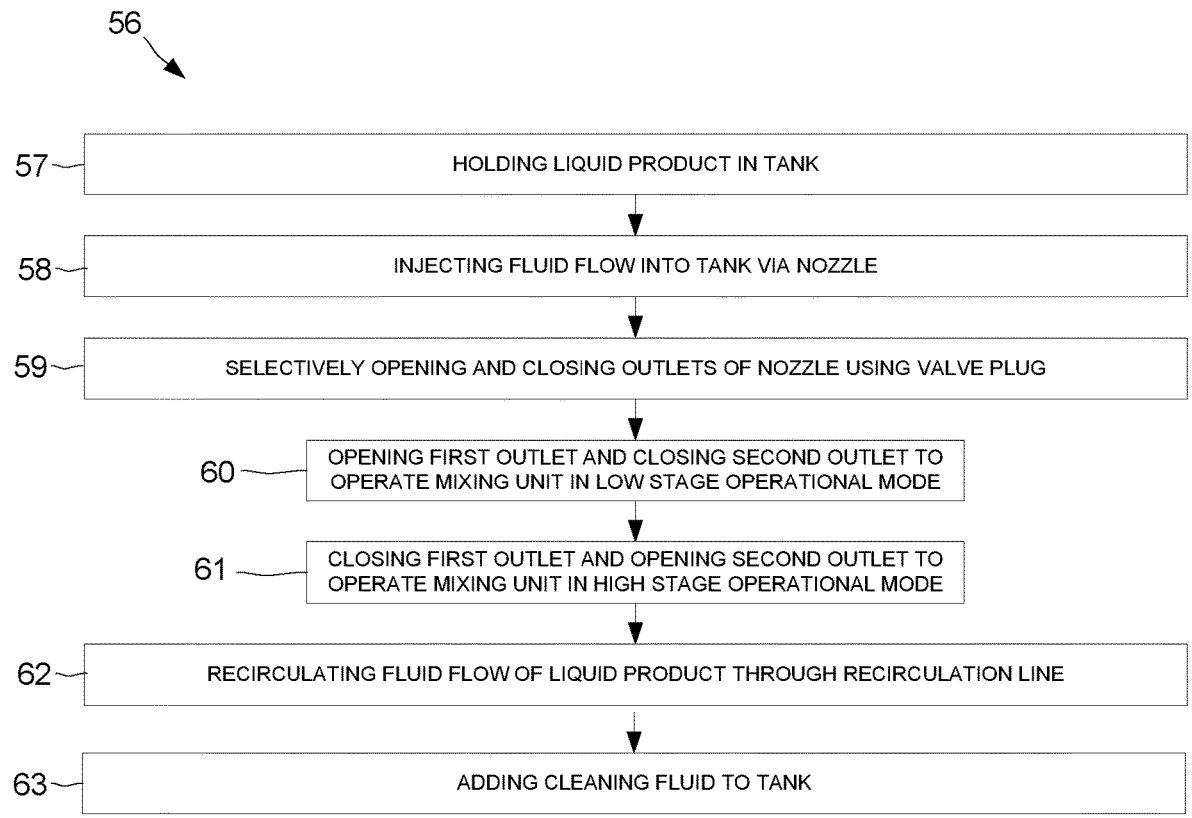
FIG. 10 is a flow chart showing a method for mixing a liquid product using the mixing unit of FIG. 1.

FIG. 10 shows a flow chart of a method 56 for mixing a liquid product. The method 56 may be performed using the mixing system 37 including the mixing unit 1 shown in FIGS. 1-9. Step 57 of the method 56 includes holding the liquid product 2 in the tank 3 and step 58 includes injecting the fluid flow 6, 7 of the liquid product into the tank 3 via the fluid nozzle 4 attached to the bottom end 5 of the tank 3, as shown in FIG. 1. Step 59 of the method 56 includes selectively opening and closing the first outlet 20 of the fluid nozzle 4 that opens in the sideways direction S and the second outlet 21 of the fluid nozzle 4 that opens in the upward direction U using the valve plug 14, as shown in FIGS. 2-4. Step 59 may include step 60, which includes opening the first outlet 20 and closing the second outlet 21 to operate the mixing unit 1 in the low stage operational mode 9 during which mixing occurs in the lower region 10 of the tank 3, as shown in FIGS. 1 and 4.

Step 59 may include step 61, which includes closing the first outlet 20 and opening the second outlet 21 to operate the mixing unit 1 in the high stage operational mode 11 during which mixing occurs in the upper region 12 of the tank 3, as shown in FIGS. 1 and 5. Step 62 of the method 56 includes recirculating the fluid flow of the liquid product 2 through the recirculation line 38, as shown in FIGS. 6-9. Step 62 may be seen as part of step 58, as the circulation may be used for accomplishing the injection of fluid via the nozzle. Step 62 may include inserting an ingredient in the hopper 43 and drawing the ingredient into the recirculation line 38 using the suction valve 42 valve that is configured to create a venturi effect. Step 63 of the method 56 includes operating the mixing unit 1 in the cleaning mode. Step 63 may include draining the liquid product 2 from the tank 3 and adding a cleaning fluid to the tank 3 to fill the tank 3 to a level that is below a position of the second outlet 21 formed on the fluid nozzle 4. Step 63 may include draining the liquid product 2 from the tank 3 and adding a cleaning fluid to the tank 3 to fill the tank 3 to a level that is below a position of the first outlet 20 formed on the fluid nozzle 4. The position of the valve plug 14 in the high stage operational mode 11, as shown in FIG. 5, and the position of the valve plug 14 in the cleaning mode may be the same.

The mixing unit and method described herein is advantageous in that the low stage operational mode and the high stage operational mode occur independently in the same tank. The desired operational mode may be selected to ensure the proper amount of mixing for a particular product. Enabling different mixing operations to occur in the same tank reduces the number of tanks, valves, and other operational components for the mixing system, as compared with conventional mixing systems. Using fewer components is also advantageous in reducing the overall amount of energy required to operate the mixing system as compared with conventional mixing systems.

From the description above follows that, although various embodiments of the invention have been described and shown, the invention is not restricted thereto, but may also be embodied in other ways within the scope of the subject-matter defined in the following claims.

The invention claimed is:

1. A mixing unit for mixing a liquid product, the mixing unit comprising:
    a tank configured to hold the liquid product;
    a fluid nozzle attached to a bottom of the tank and configured to inject a fluid flow of the liquid product into the tank; and
    an actuator positioned below the tank;
    wherein the fluid nozzle has a first outlet that opens in a sideways direction, a second outlet that opens in an upward direction, and a valve plug configured to selectively open and close the first outlet and the second outlet, the mixing unit operable in a low stage operational mode during which the first outlet is open and the second outlet is closed for effecting mixing in a lower region of the tank and in a high stage operational mode during which the first outlet is closed and the second outlet is open for effecting mixing in an upper region of the tank,
    wherein the actuator is configured to switch the mixing unit between the low stage operational mode and the high stage operational mode.

2. The mixing unit according to claim 1, wherein the fluid nozzle has a vertical orientation and the first outlet is arranged lower than the second outlet.

3. The mixing unit according to claim 1, wherein the first outlet and the second outlet are arranged perpendicular to each other.

4. The mixing unit of claim 1, wherein the tank comprises a sidewall extending from the bottom of the tank, and the fluid nozzle extends vertically from the bottom of the tank.

5. The mixing unit according to claim 1, wherein the valve plug includes an elongated control stem.

6. The mixing unit according to claim 5, wherein the control stem is axially movable to a first axial position during the low stage operational mode and to a second axial position during the high stage operational mode.

7. The mixing unit according to claim 5, wherein the valve plug includes a cone-shaped stopper that is movable relative to the second outlet to open and close the second outlet, and a circular stopper that is movable relative to the first outlet to open and close the first outlet.

8. The mixing unit according to claim 7, wherein the cone-shaped stopper and the circular stopper are axially spaced along the control stem and formed integrally with the control stem.

9. A mixing system comprising:
    the mixing unit according to claim 1; and
    a recirculation line having a pump that is fluidly connected to the mixing unit.

10. The mixing system according to claim 9, comprising an infeed arrangement that is fluidly connected to the recirculation line and configured to receive an ingredient.

11. The mixing system according to claim 10, wherein the recirculation line comprises a valve that is arranged downstream the infeed arrangement and configured to create a venturi effect to draw the ingredient into the recirculation line.

12. A method for mixing a liquid product, the method comprising:
holding the liquid product in a tank;
injecting, via a mixing unit, a fluid flow of the liquid product into the tank via a fluid nozzle of the mixing unit attached to a bottom of the tank;
selectively opening and closing, via an actuator of the mixing unit positioned below the tank, a first outlet of the fluid nozzle that opens in a sideways direction and a second outlet of the fluid nozzle that opens in an upward direction using a valve plug; the selectively opening and closing comprising:
opening the first outlet and closing the second outlet to operate the mixing unit in a low stage operational mode during which mixing occurs in a lower region of the tank; and
closing the first outlet and opening the second outlet to operate the mixing unit in a high stage operational mode during which mixing occurs in an upper region of the tank.

13. The method of claim 12, wherein the tank comprises a sidewall extending from the bottom of the tank, and the fluid nozzle extends vertically from the bottom of the tank.

14. The method according to claim 12, comprising recirculating fluid flow of the liquid product through a recirculation line.

15. The method according to claim 14, comprising:
inserting an ingredient in an infeed arrangement;
drawing the ingredient into the recirculation line using a valve that is configured to create a venturi effect.

16. The method according to claim 12, comprising emptying the liquid product from the tank,
injecting a cleaning fluid to the tank to fill the tank with the cleaning fluid to a level that is below the second outlet, and
recirculating the cleaning fluid through the fluid nozzle.

17. The method according to claim 16, comprising injecting the cleaning fluid to the tank, to fill the tank with the cleaning fluid to a level that is below the first outlet.

* * * * *